Sept. 22, 1936.   J. H. CLO   2,054,965
RIM HOLE SEAL FOR TIRES
Filed April 28, 1933   2 Sheets-Sheet 1
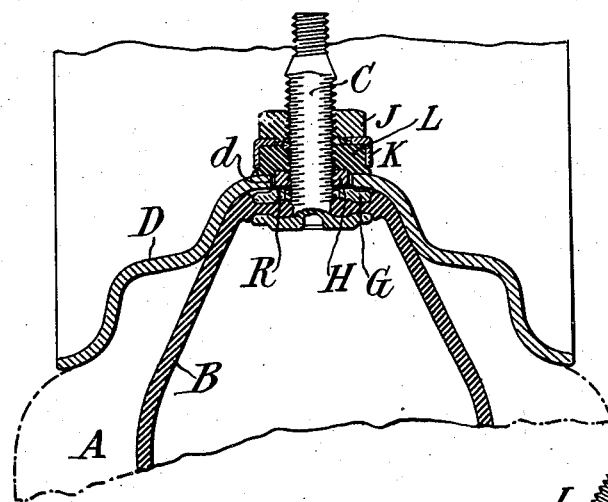
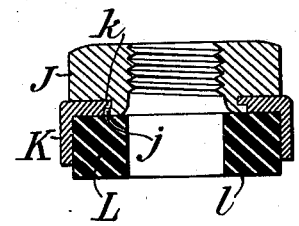
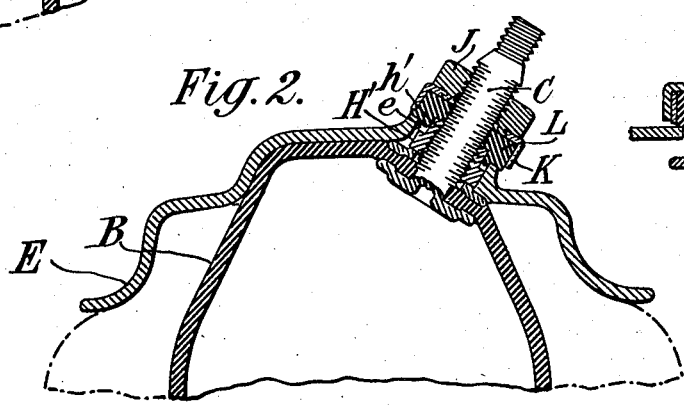
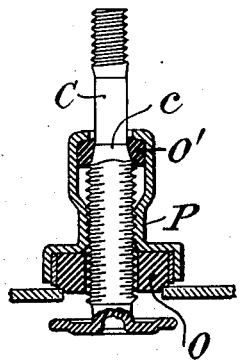
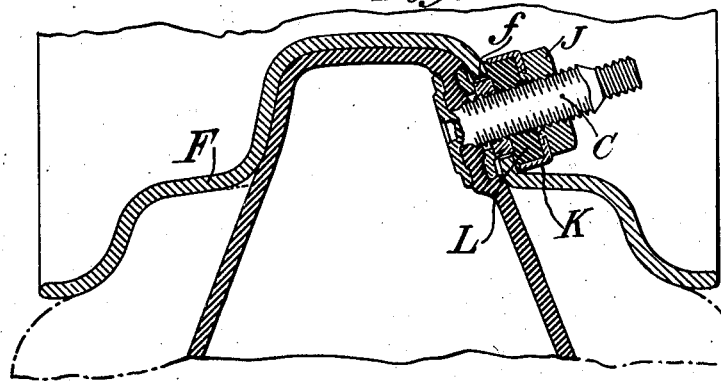
INVENTOR
Jay Harry Clo,
BY
Fraser, Myers & Manley
ATTORNEYS.

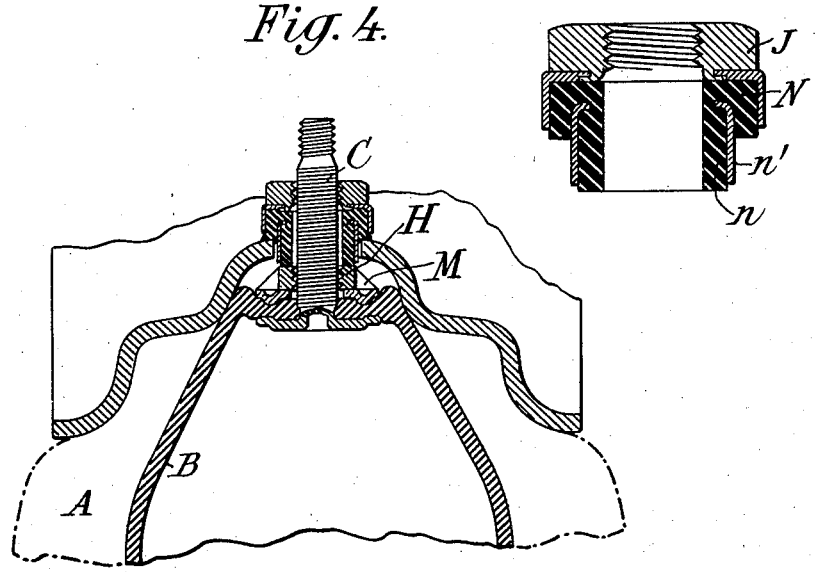
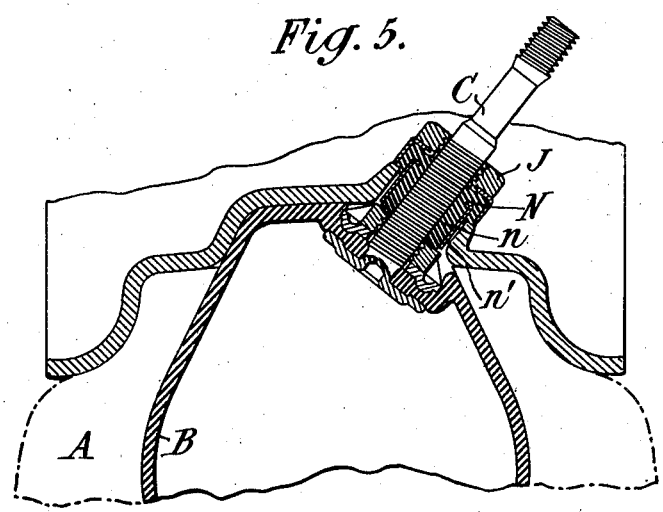

Patented Sept. 22, 1936

2,054,965

UNITED STATES PATENT OFFICE 2,054,965

RIM HOLE SEAL FOR TIRES

Jay Harry Clo, Baldwin, N. Y., assignor to A. Schrader's Son, Inc., Brooklyn, N. Y., a corporation of New York Application April 28, 1933, Serial No. 668,309

2 Claims. (Cl. 152—12)

My present invention relates to means for sealing the valve stem opening in a wheel rim and aims to provide certain improvements therein.

An object of my invention is to check the escape through the valve stem opening, of air from an inner tube which has found its way into the tire casing surrounding the tube and to trap or greatly retard the loss of said air due to a puncture, a defective patch, a leak around the valve patch or analogous causes, and thereby prevent the almost instantaneous deflation of the tire. Another object is to provide sealing means for preventing the entrance of dirt, water or other deleterious matter into the space between the inner tube and casing or rim. Another object is to prevent the formation of air pockets within the casing between the inner tube and casing or wheel rim, or both while inflating the tire.

The foregoing and other objects of my invention, which will be apparent from the detailed description which follows, I accomplish by means which are wholly operable and controllable from the exterior of the tire and which preferably cooperate directly with the valve stem, the rim and the inner tube clamping means on the valve stem.

The invention is susceptible of numerous embodiments, several of which I have shown in the accompanying drawings, wherein:—

Figs. 1 to 5 show various applications of my invention to tires mounted on drop center rims.

Figs. 6 and 7 are enlarged radial sections of rim nuts forming part of my invention.

Fig. 8 is a radial section showing a still further embodiment of my invention.

In the operation of a motor vehicle, when a tire becomes punctured by a sharp object, or by a patch giving way or from other causes, the tire becomes deflated or "goes flat" in a very few seconds and before the vehicle has traveled any considerable distance, and unless the vehicle is promptly stopped and the tube repaired or replaced by another tube, there is danger of completely ruining both the tube and the casing. Where, however, means are provided for checking the escape of air between the tube and the casing, or in other words, where the casing at the rim and around the valve opening therein is rendered substantially air-tight, the loss of air through the casing proper will be comparatively slow, except in rare cases of severe cuts or blow-outs, and the vehicle can be run for many minutes and at times hours, before serious damage will result to either the tube or the casing. Hence, at the first signs of low air pressure in the tire or suspicion of a puncture or leak therein, the tube can be examined at a service station, and if found to be punctured, the fault can be cured.

According to my present invention, the means which I employ for providing a leak-tight seal between the tire casing and the rim are so disposed as to preclude the formation of air pockets between the inner tube and the rim or casing during the inflation of the tire, and are such as readily provide for the sealing of the casing around the valve stem opening in the rim after inflation of the tire has been accomplished.

Referring first to Figs. 1 to 3, and 6 of the drawings, I have illustrated my invention as applied to a tire casing A having an inner tube B disposed therein provided with a valve stem C, the tire being mounted upon drop center rims D, E or F, having valve stem openings $d$, $e$ and $f$, respectively, which openings, in turn, are provided in the bottom, edge, and side wall of the central channels in the rims D, E and F, respectively. The valve stem C is secured to the inner tube B through the medium of a clamping washer G, which, in Figs. 1 and 3, is held in clamping engagement by a conventional hexagonal clamping nut H, and in Fig. 2 by a clamping nut H' which is formed with a tubular bushing extension $h'$. In each of these constructions the clamping nut extends through the valve stem opening in the rim and preferably protrudes slightly therethrough. Threadedly mounted on the valve stem is a rim nut J, on the lower face of which is swivelly mounted a compressible packing carrier or retaining member K which carries a compressible packing L. The swivel connection between the nut J and carrier K is provided by the interengaging flanges or lips $j$ and $k$ on the parts J and K, respectively. The compressible packing L is preferably formed of relatively soft rubber so that when the rim nut is tightened down upon the valve stem C, the seating face $l$ of the packing will engage the outer surface of the rim around the valve stem opening and also the top face of the clamping nuts $d$, $e$ and $f$, respectively, to provide a leak-tight joint with both the rim and the inner tube clamping means and thus check the escape of air which may find its way between the inner tube and the casing or rim.

In Figs. 4 and 5, I have shown my invention as applied to an inner tube and valve stem assembly in which a bridge washer M is held in clamping engagement with the inner tube by the conventional clamping nut H. Because of the angularly disposed arms or wings on the bridge washer, the inner tube clamping means are held in inwardly spaced relation from the rim, as contradistinguished from the position of said parts in Figs. 1 to 3. Hence in order to make a leak-tight seal with the valve tube clamping means or nut H, I provide a modified form of rim nut wherein the compressible packing N has an axially-extending part n of reduced diameter which is adapted to extend into and through the valve stem opening in the rim to engage the top face of the nut H. The packing N accordingly has two spaced seating faces, one adapted to engage the rim around the valve stem opening, and the other adapted to engage the clamping nut H. To prevent undue distortion of the axial portion n of the compressible packing in a direction radially outwardly, I provide said portion n with an encircling reinforcing thimble n', the upper end of which is preferably imbedded in, and vulcanized to, the packing N.

The internal diameter of the compressible packing L is preferably of a size to easily fit over the threads on the valve casing C, and where such valve casing is not provided with the conventional "flats" on opposite sides thereof, it will be apparent that the packing L under compression will also provide a direct leak-tight seal with the valve stem C. Where, however, the valve stem is provided with "flats" the packing L under compression may not form a leak-tight seal with the valve stem, and therefore the seal between the seating face of the packing and the inner tube clamping nut is relied upon to check the escape of air up past the flats of the valve stem. To still further insure against leakage around the "flats" of the valve stem, I may dispose a washer R of packing material between the clamping washer G and clamping nut H, as shown in Fig. 1.

An alternative construction of rim nut which will check the escape of air that may find its way to the flats of a valve stem is shown in Fig. 8 wherein a packing O, which is swivelly mounted within the rim nut P, is adapted to make a tight seal with the outer surface of the rim around the valve stem opening therein, and a second compressible packing O' carried within the nut at its upper end is adapted to seat upon the tapered shoulder c of the valve stem and form an air-tight seal therewith when the rim nut is screwed home upon the valve stem.

In all the embodiments of my invention hereinbefore described, it will thus be apparent that I have shown novel means for providing a leak-tight seal between the tire casing and the rim around the valve stem opening. In this connection it will be also apparent that the bead portions of a tire mounted on a channel rim when under the outward pressure exerted thereon by the inflated inner tube will provide a substantially air-tight joint between the casing and the rim. This is particularly true in the case of drop center rims wherein the bead-supporting portion of the rim is inclined radially outwardly from the median plane of the rim so that the pressure exerted upon the tire beads by an inner tube tends to tighten the tire casing on the rim and thus promote the formation of a leak-tight seal between the tire beads and the rim.

In the use of my present invention it is contemplated that during the inflation of the tire the rim nut will not be tightened against the rim so as to permit the escape of air from between the inner tube and the casing while the inner tube is being expanded within the casing and thus prevent the formation of air pockets between the tube and casing. Of course, after the tube is fully inflated, the rim nut is then tightened down into leak-tight engagement with both the rim and the inner tube clamping means to provide the desired air-tight seal. With an air-tight seal as thus provided, it will be appreciated that any escape of air from the inner tube into the casing caused by a puncture, a defective patch or so-called pin holes in the inner tube, would be either checked, or at least greatly retarded in finding its way out of the casing. Even in the case of a puncture by a sharp object penetrating the casing, it has been established that the loss of air from the inner tube is very materially retarded, and thus the damage caused by such puncture in a majority of cases does not cause the tire to "go flat" in a few seconds, as is the case where no means are provided for checking the escape of air through the valve stem opening. With my present invention, therefore, the like of pneumatic tubes and casings can be greatly prolonged.

While I have shown and described certain preferred embodiments of my invention, I do not wish to be limited to the details of construction disclosed, since it will be apparent that the same may be deviated from without departing from the spirit of my invention.

What I claim is:

1. A rim nut for tire valve stems or the like, comprising a member having a threaded opening and a compressible packing having a reduced axial extension carried by said member whereby said packing is provided with axially spaced seating faces.

2. A rim nut for tire valve stems or the like, comprising a member having a threaded opening, an element swivelly carried by said member, a compressible packing having a reduced axial extension carried by said element whereby said packing is provided with axially spaced seating faces and a reinforcing member carried by the packing and encircling the reduced extension thereof.

JAY HARRY CLO.